United States Patent Office 2,864,664
Patented Dec. 16, 1958

2,864,664

SEPARATION OF URANIUM, PLUTONIUM, AND FISSION PRODUCTS

Robert Spence and Maurice Wolfenden Lister, Didcot, England, assignors, by mesne assignments, to the United States of America as represented by the United States Atomic Energy Commission No Drawing. Application March 1, 1949
Serial No. 79,114

5 Claims. (Cl. 23—14.5)

This invention relates to the separation of uranium and plutonium from neutron irradiated uranium.

Neutron irradiated uranium contains plutonium as well as uranium and fission products. The object of the invention is to provide a method of separation of the uranium from plutonium and of uranium and plutonium from the fission products.

In accordance with the invention the neutron irradiated uranium is dissolved in nitric acid. The solution in which the plutonium appears essentially in the tetravalent state is saturated with a nitrate salt and rendered substantially stoichiometrically neutral by addition of a base. The plutonium is then reduced to the three valent state. The uranium is extracted with a substantially water immiscible organic solvent and the phases are separated. The separation of the uranium is critical dependent upon control of the acidity of the aqueous nitrate solution. It should be stoichiometrically neutral insofar as the acidity is concerned. It may be slightly basic but not so much as the precipitate uranate salts. The organic solvent extract or phase and the aqueous phase are each treated as described below.

Ammonium nitrate, aluminum nitrate, calcium nitrate, zinc nitrate, or the like may be used to saturate the acid solution of the irradiated uranium. To neutralize the saturated solution, ammonia is preferred, but calcium hydroxide, zinc oxide or the like may be used. For reducing the plutonium hydroxylamine compounds are preferred. About one gram reductor per litre of solution to be treated is satisfactory. Suitable reducing agents are hydroxylamine, hydroxylamine nitrate, hydroxylamine hydrochloride, hydroquinone, hydrazine or the like. Dibutoxy diethylether (dibutyl Carbitol) is the preferred organic extractive, but methylisobutyl ketone, dibutyl-Cellosolve or diethyl ether may be used. In batch operation, the organic solvent is conveniently used in volume equal to the neutral solution under extractive treatment. Less solvent is required in continuous column processing.

For example, one extraction of the neutral solution with dibutyl Carbitol removed more than two-thirds of the uranium from the aqueous phase and less than 1% of the plutonium appeared in the organic solvent extract phase and very little of the fission products left the aqueous phase. Using four repeated extractions with dibutyl Carbitol, one equal volume and three half volumes, the uranium content of the neutral aqueous solution was reduced to about 9 mg. per ml. from 630 mg. per ml. and about 2½% of the plutonium appeared in the dibutyl Carbitol extracts. When these extracts were separated from the aqueous phase and treated with a saturated aqueous nitrate solution 75% of the plutonium in the nitrate saturated extract passed into the aqueous solution leaving the uranium in the solvent phase practically free from plutonium.

The solvent may be recovered for reuse by washing the extract with water to remove the uranium and small amounts of plutonium and fission products remaining therein.

The residual aqueous phase, containing a small proportion of the original uranium, after separation of the organic extract is treated to oxidize the plutonium therein to the hexavalent state and the solution is rendered about 1 N in nitric acid. To oxidize the plutonium a bromate or dichromate of ammonium, potassium or sodium, potassium permanganate, or ammonium cerium nitrate may be used. The chromates or dichromates are preferred. About 2 grams per litre of the solution is adequate.

The solvent is preferably acidified with nitric acid to an amount which is in equilibrium substantially with the acid in the resulting contacting aqueous phase. With an aqueous phase 1 N in nitric acid, the solvent phase in equilibrium therewith will be about 0.8 N in nitric acid. This latter equilibrium normality will vary slightly with the amount of uranylnitrate hexahydrate present. This equilibrium normality increases with the amount of uranium present in the aqueous phase.

This acidified and oxidized solution is now treated with three successive amounts of the extractive solvent, each amount being equal in volume to one half the volume of the acidified solution, to extract the plutonium. By washing the extract with water the plutonium is recovered in the water and the solvent may be reused.

The following particular example is illustrative:

An irradiated uranium product weighing about 1000 gms. was dissolved in about 1800 ml. of 70% nitric acid yielding a solution of nitrate salts and containing one gram of uranylnitrate hexahydrate per ml. This solution was saturated with ammonium nitrate and then contained 300,000 alpha counts per minute of plutonium per ml. and ½ millicurie per ml. of fission products. The solution was made stoichiometrically neutral with ammonia. To the neutral solution 2 grams of hydroxylamine hydrochloride for each litre of neutral solution were added to reduce the plutonium. This reduced solution was treated with three successive volumes of fresh dibutyl Carbitol, each volume equal to one-half that of the aqueous solution and the phases separated. The aqueous phase contained about 10 mg. uranyl-nitrate hexahydrate per ml. and 97.5% of the plutonium and fission products remained in the aqueous phase while 98% of the uranium passed into the dibutyl Carbitol extracts.

The residual aqueous solution was made about one-normal in nitric acid and two grams of potassium dichromate per litre of residual aqueous solution was added to oxidize the plutonium. Oxidation is accomplished in about 24 hours at room temperature. Heating of the solution accelerates the oxidizing action but the solution is cooled before treating with the organic extractive. Excessive heating with a relatively high acid content results in higher fission products content in the organic extractive. Oxidation was readily accomplished by adding 2 grams of a chromate, e. g., potassium chromate to the residual aqueous solution which had been made about 0.1 to about 0.3 normal in nitric acid and followed by heating for one hour at 70° C. The solution was then cooled to room temperature, made about one normal in nitric acid and treated with organic extractive solvent to recover in the solvent the plutonium practically free of fission products. The solution was treated with three successive amounts of dibutyl Carbitol, each amount being one-half the volume of the aqueous solution, to extract over 99% of the plutonium into the dibutyl Carbitol. The fission products are almost wholly in the final residual aqueous solution. The oxidation of the plutonium is advantageously carried out in solutions about 0.1 N to about 0.3 N using chromates or dichromates and heating the solution to about 70° C.

The dibutyl Carbitol extracts containing either uranium or plutonium may be washed with water or slightly acidulated water to recover the uranium or plutonium from the organic extractive. About 0.1 molar nitric acid is used in washing to recover plutonium in the absence of uranium in the extractive. Slightly acidulated or distilled water is used to recover uranium from the organic extractive. Phase separation is sharper using acidulated water.

We claim:

1. In a method for recovery of uranium in acidic aqueous nitrate solutions containing fission products, uranium and plutonium the steps comprising essentially saturating the solution with a nitrate salt, rendering the solution substantially stoichiometrically neutral with a base, adding a reducing agent to change the plutonium to the trivalent state and extracting the uranium from the solution into an organic solvent therefor and separating the organic solvent containing the uranium.

2. In a method for recovery of uranium and plutonium in acidic aqueous nitrate solutions containing fission products the steps comprising essentially saturating the solution with a nitrate salt, rendering the solution substantially stoichiometrically neutral with a base, adding a reducing agent to change the plutonium to the trivalent state, extracting the uranium from the solution into an organic solvent therefor, removing the solvent with the uranium, making the residual aqueous solution acid with nitric acid, adding an oxidizing agent to change the plutonium to higher than the tetravalent state and adding organic solvent to extract the plutonium and separating the organic solvent with the plutonium.

3. A method of treating neutron irradiated uranium which comprises dissolving the material in nitric acid, saturating the solution with a nitrate salt, rendering the solution substantially neutral, reducing the plutonium to the trivalent state, treating the solution with a substantially water immiscible organic solvent to extract uranium, separating the extract from the aqueous phase, oxidizing the plutonium in the aqueous phase to a valence state above that obtaining on dissolution of the irradiated uranium in nitric acid, rendering the aqueous phase substantially 1 N in nitric acid, treating it with an organic solvent to extract plutonium and separating the solvent extract from the aqueous phase containing fission products.

4. A method as defined in claim 3 wherein the separated solvent extract containing uranium is treated with an aqueous nitrate solution to transfer residual plutonium therein to the aqueous nitrate phase.

5. In the treatment of acidic aqueous nitrate solutions containing plutonium and fission products the method which comprises oxidizing the plutonium to the hexavalent state, rendering the solution substantially 1 N in nitric acid and treating it with an organic solvent to extract the oxidized plutonium and leave the fission products in the aqueous phase.

References Cited in the file of this patent

UNITED STATES PATENTS 2,227,833     Hixson et al. _____ Jan. 7, 1941

OTHER REFERENCES

Smyth: A General Account of the Development of Methods of Using Atomic Energy for Military Purposes Under the Auspices of the U. S. Government, 1940–1945, p. 99, U. S. Gov't Printing Office (1945).